United States Patent
Murakami et al.

(10) Patent No.: US 9,734,163 B2
(45) Date of Patent: Aug. 15, 2017

(54) IMAGE RECOGNITION APPARATUS AND DATA REGISTRATION METHOD FOR IMAGE RECOGNITION APPARATUS

(71) Applicant: OMRON Corporation, Kyoto (JP)

(72) Inventors: Tatsuya Murakami, Suita (JP); Atsushi Irie, Nara (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/528,322

(22) Filed: Oct. 30, 2014

(65) Prior Publication Data
US 2015/0139492 A1 May 21, 2015

(30) Foreign Application Priority Data
Nov. 15, 2013 (JP) .................................. 2013-236495

(51) Int. Cl.
*G06K 9/00* (2006.01)
*G06F 17/30* (2006.01)
(Continued)

(52) U.S. Cl.
CPC ... *G06F 17/30247* (2013.01); *G06K 9/00268* (2013.01); *G06K 9/00281* (2013.01);
(Continued)

(58) Field of Classification Search
None
See application file for complete search history.

(56) References Cited

U.S. PATENT DOCUMENTS 6,608,914 B1 * 8/2003 Yamaguchi ........ G06K 9/00221
235/380
7,853,052 B2 * 12/2010 Yanagawa .......... G06K 9/00288
382/118
(Continued)

FOREIGN PATENT DOCUMENTS

EP 2639740 A2 9/2013
JP 2002-259980 A 9/2002
(Continued)

OTHER PUBLICATIONS

Korean Office Action for Application No. 10-2014-0149701, issued Oct. 30, 2015. (17 pages).
(Continued)

*Primary Examiner* — Avinash Yentrapati
(74) *Attorney, Agent, or Firm* — Nutter McClennen & Fish LLP; John J. Penny, Jr.

(57) ABSTRACT

An image recognition apparatus is provided, comprising: an extraction unit extracting feature amount data of a subject from an image; a database registering a plurality of pieces of feature amount data extracted from different images of one registered object; and a comparing unit identifying whether or not the subject is the registered object by comparing the feature amount data extracted by the extraction unit and the feature amount data of the registered object registered in the database, a registration unit, using an image for registration, adding feature amount data of the registered object to the database in accordance with a predetermined condition which includes a first condition: if new data, which is the feature amount data extracted from the image for registration, is similar to registered data, which is the feature amount data of the registered object already registered in the database, the new data is not added.

7 Claims, 7 Drawing Sheets

(51) Int. Cl.
*G06K 9/32* (2006.01)
*G06K 9/46* (2006.01)

(52) U.S. Cl.
CPC ......... *G06K 9/3241* (2013.01); *G06K 9/4609* (2013.01); *G06T 2207/10004* (2013.01)

(56) References Cited

U.S. PATENT DOCUMENTS

| | | | | |
|---|---|---|---|---|
| 8,989,504 B2* | 3/2015 | Suzuki | ............... | H04N 1/00336 382/118 |
| 2002/0136434 A1* | 9/2002 | Kuroda | ............... | G06K 9/00288 382/118 |
| 2003/0179913 A1* | 9/2003 | Murase | ............... | G06K 9/00154 382/119 |
| 2004/0086157 A1* | 5/2004 | Sukegawa | ............ | G06K 9/6255 382/115 |
| 2006/0204058 A1* | 9/2006 | Kim | ................... | G06K 9/00288 382/118 |
| 2008/0317349 A1* | 12/2008 | Ishikawa | ............ | G06K 9/00221 382/190 |
| 2009/0087038 A1* | 4/2009 | Okada | ................ | G06K 9/00268 382/118 |
| 2010/0067750 A1* | 3/2010 | Matsuo | ............. | G06F 17/30265 382/118 |
| 2011/0001840 A1* | 1/2011 | Ishii | ....................... | G02B 7/365 348/222.1 |
| 2011/0052069 A1* | 3/2011 | Nakabayashi | .... | G06F 17/30256 382/190 |
| 2011/0222743 A1* | 9/2011 | Tanaka | ............... | G06K 9/00288 382/118 |
| 2011/0311112 A1* | 12/2011 | Matsuyama | ....... | G06K 9/00295 382/118 |
| 2012/0230555 A1* | 9/2012 | Miura | ................ | G06K 9/00087 382/124 |
| 2012/0294496 A1* | 11/2012 | Nakamoto | ......... | G06K 9/00288 382/118 |
| 2013/0243328 A1* | 9/2013 | Irie | .......................... | G06K 9/46 382/192 |
| 2014/0133710 A1* | 5/2014 | Hama | ................ | G06K 9/00087 382/115 |
| 2015/0092996 A1* | 4/2015 | Tian | ................... | G06K 9/00926 382/118 |
| 2015/0125048 A1* | 5/2015 | Ikenoue | ............. | G06K 9/00288 382/118 |

FOREIGN PATENT DOCUMENTS

| | | | |
|---|---|---|---|
| JP | 2002259980 A | * | 9/2002 |
| JP | 2012-242891 A | | 12/2012 |
| JP | 2012242891 A | * | 12/2012 |
| KR | 10-2004-0038617 A | | 5/2004 |
| KR | 10-1180471 B1 | | 9/2012 |
| KR | 10-1297736 B1 | | 8/2013 |

OTHER PUBLICATIONS

Extended European Search Report for EP Application No. 14191087.7, dated Apr. 15, 2015. (8 pages).
European Office Action dated Oct. 7, 2016 in EP Application No. 14191087.7 (5 pages).
Freni, B. et al., "Replacement algorithms for fingerprint template update," Image Analysis and Recognition, Lecture Notes in Computer Science, Jun. 25, 2008, pp. 884-893.

* cited by examiner

FIG. 2
| Face image data | Feature amount data | Registration date/time |
|---|---|---|
|  | AA1, BB1, CC1, ... , XX1 | 2012/04/05 |
|  | AA2, BB2, CC2, ... , XX2 | 2012/04/05 |
|  | AA3, BB3, CC3, ... , XX3 | 2012/11/10 |
|  | AA4, BB4, CC4, ... , XX4 | 2013/01/30 |
|  | AA5, BB5, CC5, ... , XX5 | 2013/03/03 |
| ... | ... | ... |

FIG. 5
Registered data
| | Face image data | Feature amount data | Registration date/time |
|---|---|---|---|
| D1 |  | AA1, BB1, CC1, ... , XX1 | 2012/04/05 |
| D2 |  | AA2, BB2, CC2, ... , XX2 | 2012/04/05 |
| D3 |  | AA3, BB3, CC3, ... , XX3 | 2012/11/10 |
| D4 |  | AA4, BB4, CC4, ... , XX4 | 2013/01/30 |
| D5 |  | AA5, BB5, CC5, ... , XX5 | 2013/03/03 |
New data
| | | | |
|---|---|---|---|
| DN |  | AAN, BBN, CCN, ... , XXN | 2013/07/10 |
Score
| | D1  | D2  | D3  | D4  | D5  |
|---|---|---|---|---|---|
| DN  | 750 | 900 | 500 | 550 | 700 |

IMAGE RECOGNITION APPARATUS AND DATA REGISTRATION METHOD FOR IMAGE RECOGNITION APPARATUS

CROSS-REFERENCE TO RELATED APPLICATION

This application is based on Japanese Patent Application No. 2013-236495 filed with the Japan Patent Office on Nov. 15, 2013, the entire contents of which are incorporated herein by reference.

FIELD

The present invention relates to an image recognition apparatus, and in particular relates to a technique for registering feature amount data of a recognition target for an image recognition apparatus.

BACKGROUND

Image recognition is a technique of identifying a subject in an image by extracting feature amount data from the image and comparing that data with feature amount data of a known object registered in advance in a database. Image recognition is applied in various fields, such as personal authentication or individual identification by means of a biometric image, monitoring systems that detect intruders or suspicious items, work inspection in a production line or the like, identification of passersby and passing vehicles in transportation infrastructure, and the like.

Since an image captured using a camera is used in image recognition, it is unavoidable that variation will appear in the extracted feature amount due to the shooting conditions at that time (e.g., the state of the object (in the case of a face, the orientation, expression, presence of accessories, make-up, hairstyle, etc.), the lighting state, etc.). In view of this, as methods of increasing robustness with respect to the differences in imaging conditions so as to improve recognition accuracy, a method is commonly employed in which multiple pieces of feature amount data extracted from different images are registered for the same object. In other words, it is desirable to increase variation in the feature amount data registered in the database in order to improve the accuracy of image recognition.

However, it does not mean simply increasing the amount of registered feature amount data. This is because there is a limit to the number of pieces of feature amount data that can be registered in the database (or with respect to each object) due to constraints on the storage capacity of the database and on the program. That is to say, in order to be able to perform image recognition at a higher level of accuracy with a limited amount of data, optimizing the feature amount data that is to be registered is viewed as important in practical use.

JP 2002-259980A and JP 2012-242891A are examples of conventional technology related to registration and updating of feature amount data. JP 2002-259980A discloses an idea in which round-robin comparison of registration candidate data and registered data is performed, and data with a higher priority ranking is stored in the database as new registration data. Also, JP 2012-242891A discloses an idea in which comparison of registration candidate data and registered data is performed, and only registration candidate images whose degree of similarity with respect to the registered data is neither too high nor too low are presented to the user, thus making it easier for the user to sift through the registration candidates. However, in JP 2002-259980A, no method for determining the priority ranking is specifically disclosed, and it is unclear how to realize the selection of feature amount data that is to be registered and how to realize updating of the database. Also, the purpose of the method disclosed in JP 2012-242891A is to assist operations and determination performed by the user, and no specific method for automatically updating the database is provided.

JP 2002-259980A and JP 2012-242891A are examples of background art.

The present invention has been made in view of the foregoing situation, and it is an object of the invention to provide a technique for automatically optimizing feature amount data that is to be registered in the database, so that a favorable recognition accuracy is obtained.

In order to achieve the above-described object, the present invention uses a configuration in which registration, disposal, replacement, and the like of feature amount data is determined automatically, such that variation in pieces of feature amount data registered for the same registered object is maximized.

SUMMARY

In accordance with an aspect of an embodiment of the present invention, there is provided an image recognition apparatus, the image recognition apparatus comprising: an extraction unit configured to extract feature amount data of a subject from an image; a database configured to register a plurality of pieces of feature amount data extracted from different images of one registered object; and a comparing unit configured to identify whether or not the subject is the registered object by comparing the feature amount data extracted by the extraction unit and the feature amount data of the registered object registered in the database, wherein the image recognition apparatus further comprises a registration unit configured to, using a new image for registration, add feature amount data of the registered object to the database in accordance with a predetermined condition, and the predetermined condition includes a first condition whose content is such that if new data, which is the feature amount data extracted from the image for registration, is similar to registered data, which is the feature amount data of the registered object that is already registered in the database, the new data is not added.

In accordance with another aspect of an embodiment of the present invention, there is provided a data registration method for an image recognition apparatus configured to, by comparing feature amount data of a subject extracted from an image with feature amount data of a registered object registered in a database, identify whether or not the subject is the registered object, the method comprising steps of: acquiring a new image for registration; extracting feature amount data from the image for registration; and adding and registering new data, which is the feature amount data extracted from the image for registration, to registered data, which is feature amount data of the registered object that is already registered in the database, in accordance with a predetermined condition, wherein the predetermined condition includes a first condition whose content is such that if the new data is similar to the registered data, the new data is not added.

BRIEF DESCRIPTION OF THE DRAWINGS

FIG. 2 is a schematic diagram showing data structure of a feature amount database.

FIG. 5 is a diagram illustrating registration necessity determination in data registration processing according to the first embodiment.

DETAILED DESCRIPTION

Hereinafter, embodiments of the present invention will be described with reference to the drawings. The following embodiments will describe an example in which the present invention is applied to a face comparing system in which a person's face is identified using image recognition.

First Embodiment

System Configuration

Figure 1:
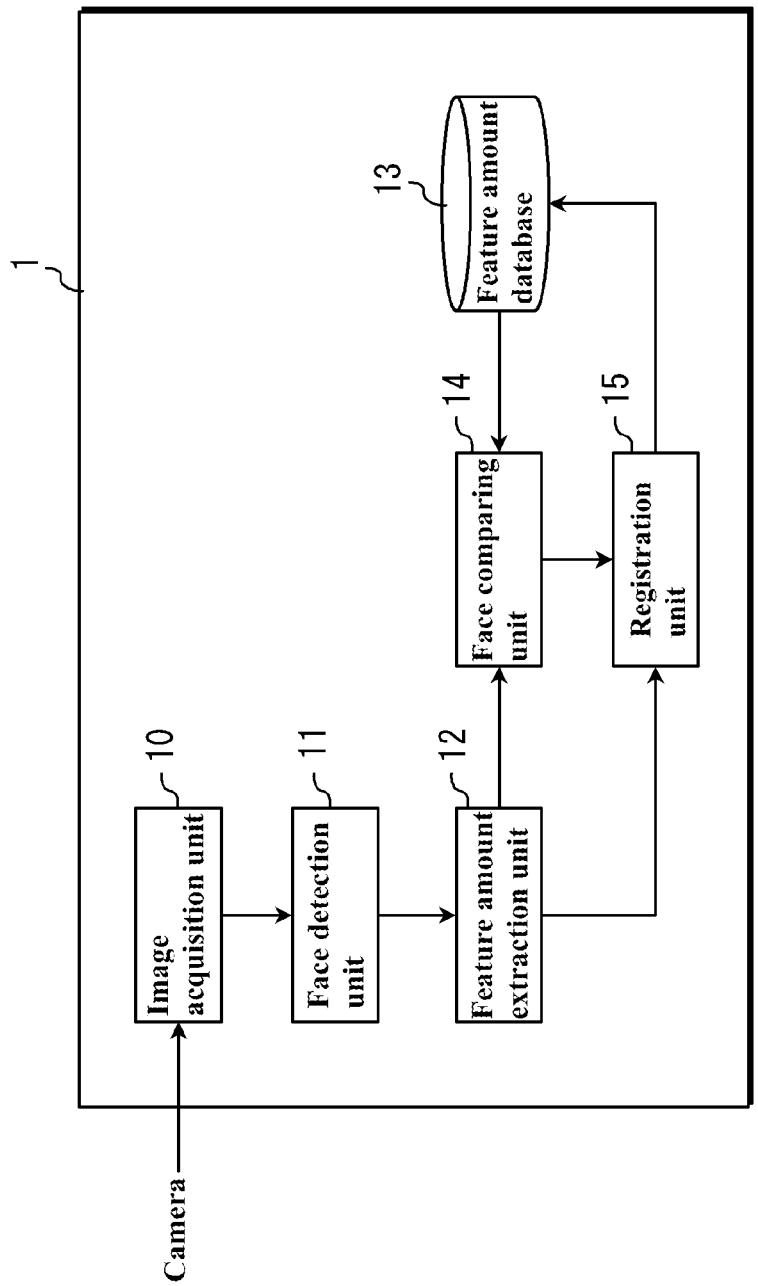
FIG. 1 is a schematic diagram showing a functional configuration of a face comparing system according to an embodiment of the present invention.

FIG. 1 is a schematic diagram showing a functional configuration of a face comparing system (image recognition apparatus) according to a first embodiment of the present invention. The face comparing system 1 is an apparatus that performs personal authentication or individual identification of a comparison target using a face image. Personal authentication is processing for checking the identity of a comparison target (one-to-one comparison), and individual identification is processing for identifying who among registered individuals registered in a database the comparison target is (one-to-many comparison). These face comparison techniques can be adapted to various applications such as a security device in an electronic apparatus (including computers, smartphones, tablet terminals), a monitoring system for intruder detection, and a gate system for performing management of entering and leaving a room and lock control for a door, for example.

As shown in FIG. 1, the face comparing system 1 includes functional elements such as an image acquisition unit 10, a face detection unit 11, a feature amount extraction unit 12, a feature amount database 13, a face comparing unit 14, and a registration unit 15. The face comparing system 1 can be configured by a computer system including hardware resources such as a processor (CPU), a memory, an auxiliary storage device, an input device, a display device, and a camera, for example, and the functional elements shown in FIG. 1 are realized by the processor executing a program and controlling the auxiliary storage device, the input device, the display device, the camera, and the like appropriately. Note that all or a portion of the functional elements may be configured by a dedicated chip (hardware logic circuit). Also, the face comparing system 1 can be configured by a combination of multiple computers or by cloud computing rather than by one computer.

The image acquisition unit 10 has a function of obtaining image data from the camera. The face detection unit 11 has a function of detecting a face in an image and specifying the position, size, and the like of the face. The image of the face portion detected here will be referred to as a "face image". Any kind of pre-existing technique may be applied in face detection processing. For example, a method of detecting a face by means of model fitting based on the outline or facial parts (eyes, nose, mouth, etc.), a method of detecting a face based on skin color or a distribution of light and dark, and the like may be used.

The feature amount extraction unit 12 has a function of extracting feature amount data from the face image. Any type of feature amount may be used. For example, the positional relationship between feature points set in the face (centers or edges of eyes, nose, mouth, or the like), contrast values, periodicity, or directional properties in the proximity of feature points, and the like may be used as the feature amount. The number of feature amounts can be set arbitrarily according to the expected recognition accuracy, and in general, several tens to several hundreds of feature amounts are extracted from one face. A set of feature amounts (referred to as feature amount data or a feature amount vector) extracted in this way can be said to be obtained by digitizing the features of the face in the image. Similarly to the fact that each person has different facial characteristics, each person has significantly different feature amount data.

The feature amount database 13 is a database that stores information regarding faces that can be recognized by the face comparing system 1 (referred to below as registered faces), and is sometimes referred to as "album data" or "dictionary data". As shown in FIG. 2, face image data used in registration, feature amount data extracted from the face image, registration date/time, and the like are stored in the feature amount database 13 as registered face information. If the orientation, expression, hairstyle, make-up, imaging time (age), or lighting state is different, variation will appear in the feature amount data for the same person (face) (this variation is sufficiently small compared to the difference between pieces of feature amount data for different people). Accordingly, multiple pieces of feature amount data with different imaging conditions, imaging times, and the like can be registered with respect to the same registered face in the feature amount database 13. FIG. 2 shows an example of multiple pieces of feature amount data that have been registered with respect to one registered face. Note that in the case of performing personal identification, a database such as that shown in FIG. 2 is held for each of the multiple registered faces that are to be the recognition target.

The face comparing unit 14 has a function of evaluating whether or not a face is the same as a registered face by comparing the feature amount data. Also, the registration unit 15 has a function of registering feature amount data in the feature amount database 13 in accordance with a predetermined condition. The details of these functions will be described with the flows of face comparison processing and data registration processing.

Face Comparison Processing

Figure 3:
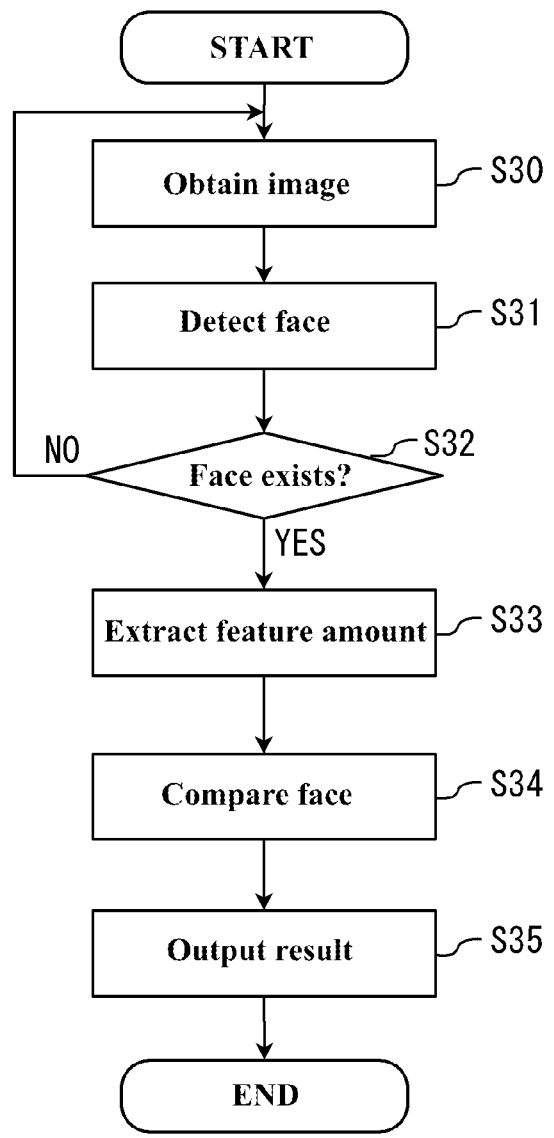
FIG. 3 is a flowchart showing a flow of face comparison processing.

FIG. 3 is a flowchart showing a flow of face comparison processing in the face comparing system 1.

First, the image acquisition unit 10 obtains an image of a comparison target from the camera (step S30). The obtained image is displayed by the display device for the user to check when needed. Next, the face detection unit 11 detects a face portion in the image (step S31). If a face was not detected (NO in step S32), the processing is repeated from the obtainment of the image. If a face is detected (YES in step S32), the feature amount extraction unit 12 extracts the feature amount data from the image of the detected face portion (step S33).

Next, the face comparing unit 14 performs identification of the comparison target by comparing the feature amount data of the comparison target extracted in step S33 with the feature amount data of a registered face that is registered in the feature amount database 13 (step S34). Specifically, the face comparing unit 14 calculates an index (referred to as a "score") indicating the closeness in distance between the feature amount data of the comparison target and the feature amount data of the registered face in a feature amount space, and determines that the faces are identical depending on whether or not the score is greater than a predetermined threshold value (the distance is close). In the present embodiment, for example, a score is used which is standardized to a value range of 0 to 1000, and if the score is greater than or equal to 600, it is deemed that the face of the comparison target is the same as the registered face. Note that if multiple pieces of feature amount data are registered for one registered face, it is sufficient that the scores between the feature amount data of the comparison target and each piece of feature amount data are obtained and a representative score (maximum value, etc.), or a composite score (weight average, etc.) thereof is used to determine whether or not the faces are identical (same-face determination). Finally, the face comparing unit 14 outputs the comparison result and the processing ends (step S35).

Data Registration Processing

Figure 4:
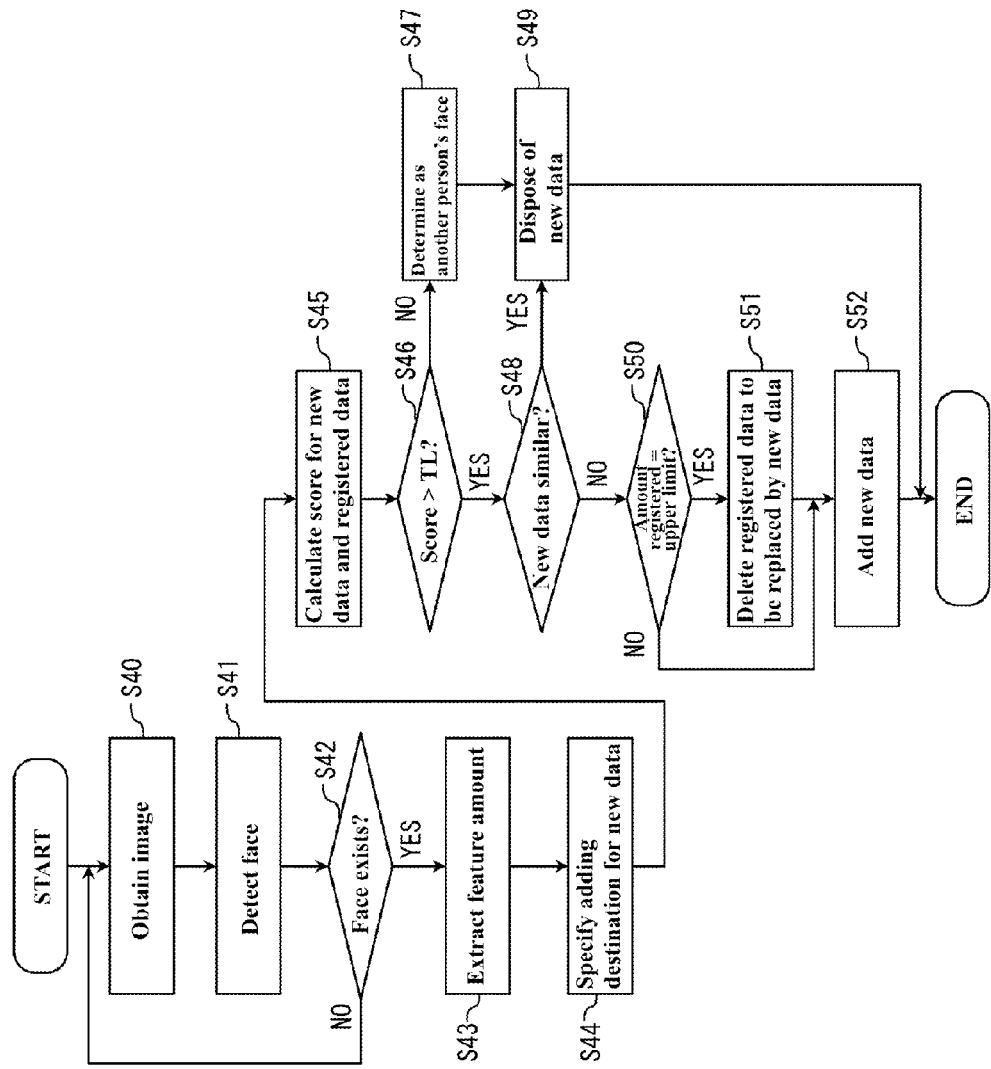
FIG. 4 is a flowchart showing a flow of data registration processing according to a first embodiment.

Processing for registering a new piece of feature amount data in the face comparing system 1 will be described next with reference to FIGS. 4 and 5. FIG. 4 is a flowchart showing a flow of data registration processing, and FIG. 5 is a diagram illustrating registration necessity determination in data registration processing.

An example will be given below in which new feature amount data is added with respect to a registered face A that has already been registered in the feature amount database 13. Here, for the sake of convenience in the description, it is assumed that the number of pieces of feature amount data that can be registered with respect to one registered face (the upper limit) is 5, but there are actual systems that are capable of registering from around a dozen to several tens of pieces of feature amount data as well.

First, the image acquisition unit 10 obtains a new image for registration from the camera (step S40). The obtained image is displayed by the display device for the user to check when needed. Next, the face detection unit 11 detects a face portion in the image (step S41). If a face was not detected (NO in step S42), the processing is repeated from the obtainment of the image. If a face is detected (YES in step S42), the feature amount extraction unit 12 extracts the feature amount data from the image of the detected face portion (step S43). Feature amount data extracted from the image for registration will be referred to as "new data" below. The processing up to this point is substantially the same as that of steps S30 to S33 in face comparison processing.

Next, the registration unit 15 specifies which registered face the new data is to be added to (step S44). For example, registered faces A, B, C, and the like that are registered in the feature amount database 13 may be displayed in a list on the display device and the user may be allowed to select the face to which the new data is to be added from among those candidates. Here, it is assumed that the registered face A was designated. Note that the processing of step S44 may be performed before step S40, and if only one registered face is registered in the feature amount database 13 or the adding destination (the registered face to which the new data is to be added) can be determined automatically, this processing may be omitted.

Next, the scores between the new data and each piece of feature amount data for the registered face A (referred to as "registered data") registered in the feature amount database 13 are calculated using the face comparing unit 14 (step S45). The score is an index that is the same as that used in same-face determination in the face comparison processing. The upper part of FIG. 5 shows new data DN that was obtained, and pieces of registered data D1 to D5 for the registered face A, and the lower part of FIG. 5 shows an example of calculating the scores between the new data DN and the pieces of registered data D1 to D5. It is shown that the greater the score is, the higher the degree of similarity in the feature amount data is.

Next, the registration unit 15 checks whether or not the score calculated in step S45 exceeds a lower-limit threshold value TL (step S46). For example, variation in the scores caused by differences in imaging conditions is obtained by means of experimentation or the like, and the lower-limit threshold value TL is set to a value that is sufficiently smaller than the minimum value of the range of variation (for example, TL=200 is used in the present embodiment). If all scores are less than or equal to the lower-limit threshold value TL (NO in step S46), the registration unit 15 deems that the new data DN is feature amount data for the face of another person that is not the registered face A, and the new data DN is not added (step S47). According to this, it is possible to prevent feature amount data for the face of another person from being registered mistakenly, and it is possible to suppress a decrease in recognition accuracy.

Next, the registration unit 15 determines whether or not it is necessary to add the new data DN. First, the registration unit 15 checks whether or not the new data DN is similar to the pieces of registered data D1 to D5 of the registered face A (step S48). Specifically, if the score calculated in step S45 is greater than or equal to an upper-limit threshold value TH, it is deemed that the new data and the registered data are similar. For example, variation in the scores caused by differences in imaging conditions may be obtained by means of experimentation or the like and the upper-limit threshold value TH may be set based on an average or a variance of the scores (lowering the upper limit threshold TH has an effect of increasing variation in the feature amount data).

If the new data DN is similar to any of the pieces of registered data D1 to D5 (YES in step S48), the registration unit 15 determines that the new data DN is not needed and does not add the new data DN (step S49). For example, in the example of FIG. 5, if the upper-limit threshold value TH is set to 850, the score between the new data DN and the registered data D2 exceeds the upper-limit threshold value TH, and therefore the new data DN is not added.

On the other hand, if the new data DN is not similar to any of the pieces of registered data D1 to D5 (e.g., if the upper-limit value TH is set to 950 in the example of FIG. 5), the registration unit 15 adds the new data DN to the feature amount database 13 (step S52). At this time, the registration unit 15 checks whether or not the number of pieces of registered data has reached the upper limit (step S50), and if it has reached the upper limit, the registered data whose score (degree of similarity) with the new data DN is the highest (D2 in the example of FIG. 5) is deleted (step S51), and the new data DN is registered in its place (step S52).

Advantages of the Present Embodiment

According to the configuration of the above-described embodiment, when an image for registration is provided, it is determined whether or not the new data is to be registered in accordance with a pre-determined condition rather than adding the new data to the feature amount database 13 unconditionally. Specifically, as shown in step S48 in FIG. 4, it is evaluated whether or not the new data is similar to the registered data, and if the new data is similar to any piece of registered data, the new data is not added (first condition). Accordingly, it is possible to automatically suppress a case in which similar feature amount data (data that contributes little to the improvement of recognition accuracy) is registered in the feature amount database 13. This suppresses the unneeded accumulation of data, making it possible to use the limited database capacity effectively. Also, since only pieces of feature amount data that are not mutually similar are registered, variation in the feature amount data increases without the user (the person registering data) being particularly aware of it, and a database according to which a favorable recognition accuracy is obtained can be easily constructed.

Furthermore, if the number of pieces of registered data has reached an upper limit, one of the pieces of registered data is replaced with the new data (rather than disposing of the new data). In this way, by adding the newest piece of feature amount data that is not similar to the registered data, the feature amount database 13 can be automatically maintained at the newest state, and an improvement in recognition accuracy can be achieved. Moreover, at that time, the piece of registered data with the highest degree of similarity with the new data is replaced with the new data, and therefore the database can be updated such that variation in the feature amount data is maintained or increased.

Furthermore, in the present embodiment, the score that is used in face comparison processing is used as an index for evaluating the similarity between the new data and the registered data. This method is advantageous in that similarity is determined by directly comparing two pieces of feature amount data, and therefore the cost of calculation can be reduced. Since the program module for face comparison processing may also be used for this purpose, there is an advantage in that a reduction in development costs and a simplification of the system configuration can be achieved.

Second Embodiment

In the first embodiment, a configuration is used in which new data that is similar to registered data is never added, but in the second embodiment, a configuration is used in which even new data that is similar to registered data is added and registered until the number of pieces of registered data reaches an upper limit. This is because an improvement in recognition accuracy can be expected with more feature amount data rather than with less. Since other configurations are similar to those of the first embodiment, only characteristic portions of the second embodiment will be described hereinafter.

Figure 6:
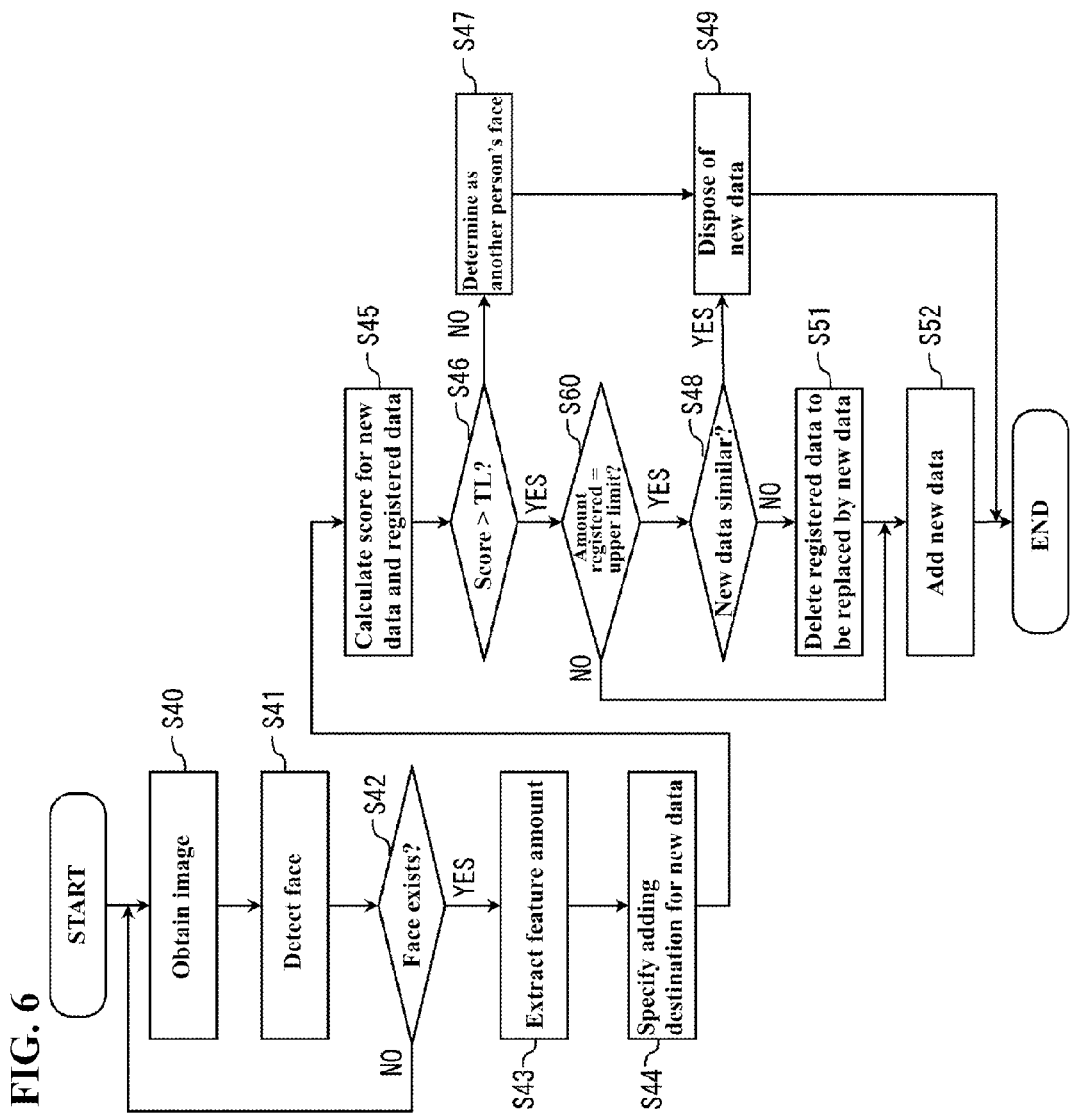
FIG. 6 is a flowchart showing a flow of data registration processing according to a second embodiment.

FIG. 6 is a flowchart showing a flow of data registration processing in a face comparing system according to the second embodiment. The processing of steps S40 to S47 is exactly the same as the corresponding processing of the first embodiment.

Next, the registration unit 15 checks whether or not the number of pieces of registered data for the registered face A has reached an upper limit (step S60). If the upper limit has not been reached, the registration unit 15 registers the new data DN in the feature amount database 13 (step S52). That is to say, a second condition (step S60), according to which the new data DN is added and registered in the case where the number of pieces of registered data has not reached the upper limit, is given priority over the first condition (step S48), according to which new data DN that is similar is not added and registered. Accordingly, the new data DN is added to and registered in the feature amount database 13 regardless of whether or not the new data DN is similar to the registered data.

If the number of pieces of registered data has reached the upper limit, the similarity between the new data DN and the registered data is checked, similarly to the first embodiment (step S48), and if the new data DN is similar, it is not added (step S49). Only new data DN that is not similar is used to replace a piece of registered data (step S51, S52).

With the configuration of the above-described embodiment as well, it is possible to obtain an effect similar to that of the first embodiment. In addition, in the present embodiment, it is possible to achieve an improvement in recognition accuracy in an early stage since increasing the amount of registered feature amount data is given priority over increasing variation in the feature amount data in stages in which a small amount of data has been registered (stages in which the upper limit has not been reached).

Third Embodiment

In the first embodiment, the similarity between new data and registered data was evaluated using a score between the two, but in the third embodiment, the similarity between the new data and the registered data is determined by evaluating the correlation (resemblance) between scores with respect to other pieces of registered data.

The basic configuration and processing is similar to those of the first embodiment and the second embodiment, but three processes, namely those of step S45 (score calculation), step S48 (determination of similarity between new data and registered data), and step S51 (selection of registered data that is to be replaced) in the flows of FIGS. 4 and 6 are different. The contents of these three processes will be described below with reference to FIG. 7.

Figure 7:
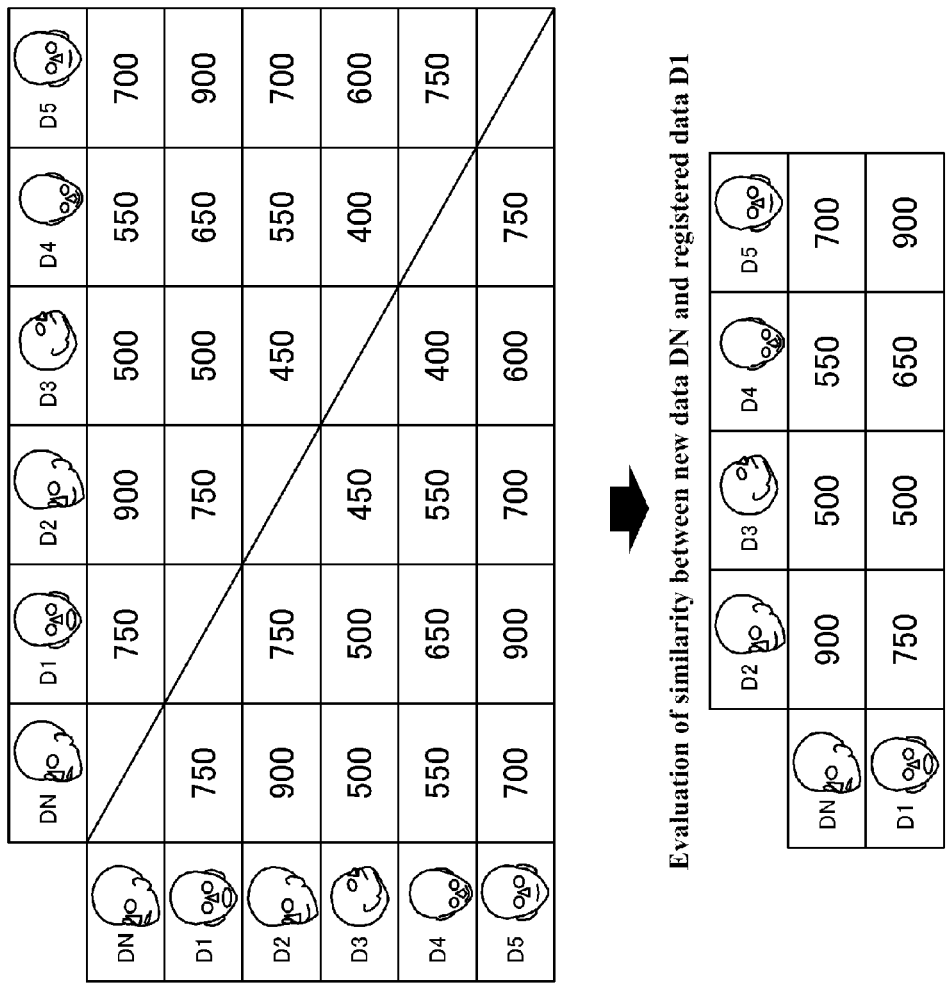
FIG. 7 is a diagram illustrating registration necessity determination in data registration processing according to a third embodiment.

In step S45, the face comparing unit 14 is used to calculate scores for all combinations of new data and registered data. The score is an index that is the same as that used in same-face determination in the face comparison processing. The upper portion of FIG. 7 shows an example of calculating scores for every combination of the 6 pieces of data, namely DN and D1 to D5. Note that the pieces of data DN and D1 to D5 are the same as those shown in the upper portion of FIG. 5.

In steps S46 and S47, similarly to the first and second embodiments, feature amount data for another person's face is prevented from being registered mistakenly by checking whether or not the scores between the new data DN and the registered data D1 to D5 (the scores in the first row of the upper portion of FIG. 7) are greater than the lower-limit threshold value TL.

In step S48, the registration unit 15 determines whether or not it is necessary to add the new data DN. At this time, as described above, the similarity between the new data and the registered data is determined using the correlation between scores with respect to other pieces of registered data. For example, when evaluating the similarity between the new data DN and the registered data D1, attention is given to the scores between the new data DN and the other pieces of registered data D2 to D5, and to the scores between the registered data D1 and the other pieces of registered data D2 to D5, as shown in FIG. 7. With the registration unit 15, the correlation between these two scores (groups of scores) is obtained, and if the correlation is stronger than a predetermined reference (if the distributions of the scores are similar), it is determined that the new data DN and the registered data D1 are similar. The similarity determination is repeated for all combinations of new data and registered data, and it is checked whether or not any of the pieces of registered data D1 to D5 are similar to (have a strong correlation with) the new data.

The strength of the correlation may be evaluated using any kind of method. For example, it is possible to calculate correlation coefficients for two groups of scores and determine that the pieces of data are similar if the correlation coefficients are greater than a predetermined value. Alternatively, if a score between pieces of data Da and Db is written as S(Da, Db), the difference between scores with respect to the same piece of registered data Di, that is, S(DN, Di)−S(D1, Di), can be calculated for each piece of registered data Di (i=2 to 5), and if the variance of differences is smaller than a predetermined value, it can be determined that the pieces of data are similar. Alternatively, if the sum or squared sum of the absolute values of the differences is less than a predetermined value, it may be determined that the pieces of data are similar. Any kind of evaluation method other than those described herein may be used.

In step S51, the registration unit 15 selects the piece of registered data that is to be replaced by the new data DN. In the first embodiment, the piece of registered data with the highest degree of similarity with the new data DN is replaced with the new data DN, but in the present embodiment, degrees of similarity are obtained for all combinations of pieces of registered data, and one of the two pieces of registered data with the highest degree of similarity therebetween is replaced with the new data DN. The degree of similarity evaluated in step S51 may be the score itself, and it may be the index used in step S48 (i.e., the correlation between scores with respect to the other pieces of registered data). For example, if a score is used as the index for the degree of similarity, in the example shown in the upper portion of FIG. 7, the set of the pieces of registered data D1 and D5, whose score is the largest, is selected as the target of replacement. At this time, either of the pieces of registered data D1 and D5 may be replaced, but preferably, D1, which is the older of the two pieces of registered data (has the earlier registration date/time) is replaced with the new data DN. Biometric information of a face or the like changes due to aging or physical changes, and therefore there is a possibility that the reliability of the feature amount data will decrease over time. Accordingly, by disposing of older data and replacing it with new data, it is possible to further increase recognition accuracy.

According to the configuration of the above-described present embodiment, in addition to the effects of the first and second embodiments, the following advantages are present. In the present embodiment, the similarity between the new data DN and the registered data (e.g., D1) is evaluated using the strength of the correlation between the "scores between the registered data D1 and the other pieces of registered data D2 to D5" and the "scores between the new data DN and the other pieces of registered data D2 to D5". Here, the "scores between the registered data D1 and the other pieces of registered data D2 to D5" correspond to the variation in the group of pieces of feature amount data that is currently registered, and the "scores between the new data DN and the other pieces of registered data D2 to D5" correspond to the variation in the group of pieces of feature amount data in the case where one piece of registered data (D1) is replaced with the new data DN. Accordingly, by evaluating the strength of the correlation between the two, the similarity between the registered data and the new data can be determined in the interest of determining whether or not the variation in the group of pieces of feature amount data will change if a piece of the registered data is replaced. Although the calculation cost is higher than that of the method described in the first and second embodiments (direct comparison), this method is advantageous in that it can be determined with greater accuracy whether or not new data needs to be added and registered.

Other Embodiments

The above-described embodiments merely indicate examples of the present embodiment. For example, the following configurations may be used as embodiments of the present invention.

(1) A face comparing system was described as an example in the above embodiments, but in addition to a face comparing system, the present invention may also be applied to any image recognition apparatus. Also, in addition to a face, an eye fundus, a pupil, a fingerprint, a handprint, an ear, an upper body, or an entire body can be used as the recognition target (object), and the recognition target is not only a living organism such as a person or an animal, but it can also be a general object such as an industrial product, a vehicle, or a food item. In short, as long as it is an object that can be recognized by means of an image feature amount, the present invention can be applied thereto.

(2) In the above-described embodiments, face comparing processing and data registration processing were completely separate, but these processes may be executed in succession. That is to say, data registration processing is performed using an image of a comparison target used in face comparison processing as the image for registration. For example, if the comparison target is successfully identified in step S34 of the face comparison processing shown in FIG. 3, the image and the feature amount data thereof are used again in the processing of step S48 in FIG. 4 or FIG. 6. According to this, the feature amount database is automatically maintained each time face comparison is performed, and an improvement in recognition accuracy is successively achieved.

(3) The values for the scores and the threshold values indicated in the embodiments above are merely examples. The score calculation method, value range, threshold value, and the like may be designed as appropriate according to the recognition target, the required level of accuracy, and the like.

(4) In the data registration processing of the above-described embodiments, three processes, namely prevention of mistaken registration of feature amount data for another person (steps S46 and S47), prevention of adding similar feature amount data (steps S48 and S49), and replacement of data in the case where the amount of data has exceeded the upper limit (steps S51 and S52) were executed, but any of these processes may be omitted.

Disclosed is an image recognition apparatus according to an embodiment of the present invention including: an extraction unit configured to extract feature amount data of a subject from an image; a database configured to register a plurality of pieces of feature amount data extracted from different images of one registered object; and a comparing unit configured to identify whether or not the subject is the registered object by comparing the feature amount data extracted by the extraction unit and the feature amount data of the registered object registered in the database, wherein a registration unit is further included as a function for data registration that, using a new image for registration, adds feature amount data of the registered object to the database in accordance with a predetermined condition. The predetermined condition includes a first condition whose content is such that if new data, which is the feature amount data extracted from the registration image, is similar to registered data, which is the feature amount data of the registered object that is already registered in the database, the new data is not added.

Accordingly, when an image for registration is provided, new data is not added to the database unconditionally, but rather it is evaluated whether or not the new data is similar to the registered data, and if the new data is similar to the registered data, the new data is not added. Accordingly, it is possible to automatically suppress a case in which the same kind of feature amount data (data that contributes little to the improvement of recognition accuracy) is registered in the database. This suppresses the unneeded accumulation of data, making it possible to use the limited database capacity effectively. Also, since variation in the feature amount data increases without the user (person registering data) being particularly aware of it, a database by which a favorable recognition accuracy is obtained can be easily constructed.

A configuration may be used in which new data that is similar to registered data is not added at all, and a configuration may be used in which certain exceptions are provided. For example, the predetermined condition may further include a second condition whose content is such that the new data is added to the database if the number of pieces of registered data for the registered object has not reached an upper limit at which registration in the database is possible, and the second condition may be given priority over the first condition. By providing this exception (second condition), new data is registered in the database even if the new data is similar to the registered data. Since an improvement in recognition accuracy can be expected with more feature amount data rather than with less, in the stage where the amount registered is low, increasing the amount of feature amount data is given priority over increasing variation in the feature amount data. With this kind of control, it is possible to achieve an improvement in recognition accuracy at an early stage.

In the case where the number of pieces of registered data for the registered object has reached the upper limit at which registration in the database is possible and the new data is to be added to the database, the registration unit may replace one of the plurality of pieces of registered data for the registered object with the new data. In this way, by adding the newest piece of feature amount data that is not similar to the registered data, it is possible to achieve automatic maintenance of the database in order to further increase the recognition accuracy.

The registered data that is to be replaced by the new data can be determined as follows. For example, the registration unit may obtain, for each of the plurality of registered data, a degree of similarity between the new data and the each of the plurality of pieces of registered data, and replace, with the new data, the registered data having the highest degree of similarity with the new data. Alternatively, for all combinations of two pieces of registered data selected from the plurality of pieces of registered data, the registration unit may obtain a degree of similarity between the two pieces of registered data and replace, with the new data, one of the two pieces of registered data having the highest degree of similarity therebetween. By replacing data in this way, it is possible to update the database such that variation in the feature amount data is maintained or increased.

The registration unit may replace, with the new data, the older of the two pieces of registered data having the highest degree of similarity therebetween. By disposing of old data and replacing it with new data, the recognition accuracy can be increased.

If the new data is dissimilar to all of the pieces of registered data to an extent of being evaluated as being a piece of feature amount data for an object that is different from the registered object, the registration unit may not add the new data. Accordingly, it is possible to prevent feature amount data for an object that is not the registered object from being registered mistakenly, and it is possible to suppress a decrease in the recognition accuracy.

Here, any algorithm may be used to evaluate the similarity between the new data and the registered data. For example, the registration unit may evaluate the similarity between the new data and the registered data using closeness in a distance between the new data and the registered data in a feature amount space. This method is advantageous in that similarity is determined by directly comparing two pieces of feature amount data, and therefore the cost of calculation can be reduced. This method may be used if there are many pieces of registered data.

Alternatively, if a plurality of pieces of registered data exist, the registration unit may evaluate the similarity between the new data and one piece of registered data using a strength of correlation between a first distance between the one piece of registered data and another piece of registered data in a feature amount space and a second distance between the new data and the another piece of registered data in the feature amount space. Note that if there are a plurality of "other pieces of registered data", consideration may be given to the distances with respect to each piece of registered data. Here, "distance between the piece of registered data and another piece of registered data in the feature amount space" corresponds to the variation in the group of pieces of feature amount data that is currently registered, and "distance between the new data and the another piece of registered data in the feature amount space" corresponds to the variation in the group of pieces of feature amount data in the case where one piece of registered data is replaced with new data. Accordingly, by evaluating the strength of the correlation for both pieces of data, the similarity between the registered data and the new data can be determined in the interest of determining whether or not the variation in the group of pieces of feature amount data will change if a piece of the registered data is replaced. Although the calculation cost is higher than the above-described direct comparison, this method is advantageous in that it can be determined with greater accuracy whether or not new data is needs to be added and registered.

In an embodiment of the present invention, "object" refers to the target of image recognition. As long as recognition by means of image feature amount is possible, anything can be the "object" of an embodiment of the present invention. For example, in the case of individual object recognition of a person or an animal, a face, eye fundus, pupil, fingerprint, handprint, ear, upper body, entire body, or the like, which are referred to as biometric information, can be the object, and in the case of general object recognition, a body of matter, a portion thereof, or the like can be the object. "Registered object" refers to an object whose feature amount data has been registered in the database (i.e., an object that can be recognized by the apparatus). The number of registered objects that can be registered in the database may be one or more.

Note that an embodiment of the present invention may be an image recognition apparatus including at least a portion of the above-mentioned configurations or functions, a registration apparatus that registers feature amount data for an image recognition apparatus, or an electronic device including an image recognition apparatus. Also, an embodiment of the present invention may be an image recognition method including at least a portion of the above-described processing, a method for registering data for an image recognition apparatus, a program for causing an image recognition apparatus (computer) to execute the method, or a computer-readable recording medium non-transitorily recording such a program. An embodiment of the present invention can be configured using a combination of the above configurations and processing as long as no technical conflicts occur.

According to the present invention, feature amount data that is registered in the database can be automatically optimized so that a favorable recognition accuracy is obtained.

The invention claimed is:

1. An image recognition apparatus comprising at least one of a computer or a logic circuit comprising:
 a processor configured to execute a program for controlling the image recognition apparatus to operate as:
  an extraction unit configured to extract feature amount data of a subject from an image;
 a database configured to register a plurality of pieces of feature amount data extracted from different images of a registered object;
  a comparing unit configured to identify whether the subject is the registered object by comparing the extracted feature amount data and the registered feature amount data; and
  a registration unit configured to, using a new image for registration, add feature amount data of the registered object to the database in accordance with a predetermined condition, the predetermined condition including a first condition whose content is such that if new data, corresponding to the feature amount data extracted from the image for registration, are similar to registered data, corresponding to the feature amount data of the registered object that is already registered in the database, the new data are not added;
 wherein if number of pieces of registered data for the registered object reaches an upper limit at which registration in the database is possible and new data are to be added to the database, the registration unit is configured to replace one of the plurality of pieces of registered data for the registered object with the new data; and
 the registration unit is configured to obtain, for each of the plurality of pieces of registered data, a degree of similarity between the new data and each of the plurality of pieces of registered data and replace, with the new data, the piece of registered data having the highest degree of similarity with the new data, wherein if the plurality of pieces of registered data exist, the registration unit is configured to evaluate the similarity between the new data and one piece of registered data of the registered object using a strength of correlation between a first distance between the one piece of registered data and another piece of registered data of the registered object in a feature amount space and a second distance between the new data and the another piece of registered data in the feature amount space.

2. The image recognition apparatus according to claim 1, wherein the predetermined condition further includes a second condition whose content is such that the new data are added to the database if the number of pieces of registered data for the registered object has not reached the upper limit at which registration in the database is possible, and the second condition is given priority over the first condition.

3. The image recognition apparatus according to claim 1, wherein if the new data are dissimilar to all of the pieces of registered data to an extent of being evaluated as being a piece of feature amount data for an object that is different from the registered object, the registration unit does not add the new data.

4. The image recognition apparatus according to claim 1, wherein the registration unit evaluates the similarity between the new data and the registered data using closeness in a distance between the new data and the registered data in a feature amount space.

5. The image recognition apparatus according to claim 1, wherein the registered object is a face.

6. A data registration method for an image recognition apparatus for comparing feature amount data of a subject extracted from an image with feature amount data of a registered object registered in a database and identifying whether the subject is the registered object, the method comprising:
 acquiring a new image for registration;
 extracting feature amount data from the image for registration; and
 adding and registering new data to registered data, the new data being the feature amount data extracted from the image for registration and the registered data being feature amount data of the registered object that is already registered in the database, in accordance with a predetermined condition, the predetermined condition including a first condition whose content is such that if the new data is similar to the registered data, the new data is not added;
 if the number of pieces of registered data for the registered object reaches an upper limit at which registration in the database is possible and the new data are to be added to the database:
 replacing one of the plurality of pieces of registered data for the registered object with the new data; and
 obtaining, for each of the plurality of pieces of registered data, a degree of similarity between the new data and the each of the plurality of pieces of registered data and replacing, with the new data, the piece of registered data having highest degree of similarity with the new data, and if the plurality of pieces of registered data exist, evaluating the similarity between the new data and one piece of registered data using a strength of correlation between a first distance between the one piece of registered data of the registered object and another piece of registered data of the registered object in a feature amount space and a second distance between the new data and the another piece of registered data in the feature amount space.

7. A non-transitory computer-readable recording medium storing a program for causing a computer to execute the steps of the data registration method according to claim 6.

* * * * *